United States Patent
Michelman et al.

(10) Patent No.: US 6,487,567 B1
(45) Date of Patent: *Nov. 26, 2002

(54) METHOD AND SYSTEM FOR MANIPULATING PAGE-BREAKS IN AN ELECTRONIC DOCUMENT

(75) Inventors: Eric H. Michelman, Bellevue; Michael Christopher Connolly, Seattle; Paul A. Hagger, Redmond, all of WA (US); Jo Anne M. Mowery, Eugene, OR (US)

(73) Assignee: Microsoft Corporation, Redmond, WA (US)

(*) Notice: Subject to any disclaimer, the term of this patent is extended or adjusted under 35 U.S.C. 154(b) by 56 days.

This patent is subject to a terminal disclaimer.

(21) Appl. No.: 09/631,515

(22) Filed: Aug. 3, 2000

Related U.S. Application Data (63) Continuation of application No. 08/824,137, filed on Mar. 25, 1997, now Pat. No. 6,128,633.

(51) Int. Cl.$^7$ .............................................. G06F 15/00
(52) U.S. Cl. ...................... 707/525; 707/527; 707/530; 345/788; 345/798; 345/800
(58) Field of Search ................. 707/525, 527, 707/530; 345/788, 798, 800

(56) References Cited

U.S. PATENT DOCUMENTS

| | | | | |
|---|---|---|---|---|
| 4,709,348 A | * | 11/1987 | Horn et al. | 707/525 |
| 4,723,211 A | * | 2/1988 | Barker et al. | 707/514 |
| 5,911,146 A | * | 6/1999 | Johari et al. | 707/525 |
| 6,047,296 A | * | 4/2000 | Wilmott et al. | 707/513 |

OTHER PUBLICATIONS

Simpson, WordPerfect 5.1 & 5.2 for Windows, 1993, Sybex Inc., pp. 242–243.*
Novell Inc., WordPerfect, 1996, version 6.1, pp. 418–420.*
Corel Corporation, Corel WordPerfect, version 6.1, Apr. 15, 1996, sreen printouts pp. 1–2.*

* cited by examiner

*Primary Examiner*—Stephen S. Hong
*Assistant Examiner*—Cong Lac Huynh
(74) *Attorney, Agent, or Firm*—Merchant & Gould P.C.

(57) ABSTRACT

A system for manipulating page-breaks in an electronic document. A User Interface Process provides a graphical user interface allowing a user to select a page-break within an electronic document and then identify a new location for the page-break. A System Process performs the steps of moving the selected page-break to the new location and adjusting the scaling and the automatic page-breaks for the remainder of the document to accommodate the page-break at the new location.

6 Claims, 4 Drawing Sheets

METHOD AND SYSTEM FOR MANIPULATING PAGE-BREAKS IN AN ELECTRONIC DOCUMENT

This application is a continuation of U.S. patent application Ser. No. 08/824,137, filed Mar. 25, 1997, now U.S. Pat. No. 6,128,633.

TECHNICAL FIELD

The present invention is generally directed to word processing or document processing programs and, more particularly, relates to a method for manipulating the location of page-breaks within an electronic document and automatically formatting the remainder of the document in response to manipulating a page-break.

BACKGROUND OF THE INVENTION

Personal computers have become a primary platform for generating documentation in a variety of settings such as business offices, homes, schools, and the like. The ability to use a personal computer for creating documents has been greatly facilitated by the development of computer applications such as "MICROSOFT WORD", a word processing program, and "MICROSOFT EXCEL", a personal and business accounting spreadsheet program, both published by Microsoft Corporation of Redmond, Wash. These programs and similar programs are generically referred to as "document processing programs". Operating these programs on a computer, allows a user to generate documents which can then be stored on magnetic media for future use and/or printed on paper. A document stored on magnetic media is referred to as an "electronic document" or a "soft-copy", whereas a printout of the document is referred to as a "print-out" or a "hard-copy".

When using a document processing program to generate or modify an electronic document, the information contained in the electronic document can be viewed on a display device such as a computer monitor. Due to the limited viewing size of the display screen for a typical computer monitor, only a portion of a large document can be viewed at any one time. Thus, most document processing programs include a display scaling feature. The display scaling feature allows users to reduce the display scale of an electronic document so that more information can be viewed on the display screen. Additionally, the user can increase the display scale of an electronic document so that less information can be viewed, but, with more clarity.

Hard-copies of an electronic document are useful when delivering final versions of a document or when proofreading draft versions of a document. Hard-copies are generated by sending a stream of information to a local printer, attached to a port of the computer, or to a remote printer, functionally connected to the computer through a network. The stream of information must conform to specific format and protocol requirements for the particular printer being used. Generally, the stream of information consists of a series of commands (i.e., line-feeds, carriage returns, form feeds, text formats, etc.) and data.

A typical printer may support a variety of paper sizes. To accommodate this, document processing programs may include a feature which allows a user to select or input information defining the dimensions and/or the margins of a page. Based on these dimensions, the document processing program determines the amount of information that can fit on a single page and divides the electronic document accordingly. In a simplistic view, the stream of information sent to a printer when printing multiple pages of an electronic document consist of printable information separated by delimiters. These delimiters, usually referred to as form-feeds, are used to identify the end of a page.

Prior to printing a multiple page electronic document, document processing programs allow the user to identify where the page-breaks of the document are located. A page-break may consist of a code which is embedded within the electronic document and is used for identifying the boundaries of a page. The page-breaks can be used by the document processing program to determine the location that form-feeds should be placed in the stream of information sent to the printer. The page-breaks can be displayed on the display screen in a variety of manners. The method used by the "MICROSOFT WORD" product is to place a dashed line between the last line of one page and the first line of the succeeding page. Other products use techniques such as displaying a special character, a solid line, or words such as "page-break" after the last line on a page.

Prior to printing a document, the user can examine the page-breaks to determine if they are positioned at undesirable locations (i.e., in the middle of a table or between a sub-header and the following paragraph). If a user determines that a page-break is located at an undesirable location, the user can force the page-break to move to a different location. One method to accomplish this is to enter "white space" or blank lines above a page-break. This results in forcing the page-break to move down in the document. Another method is to delete white space above a page-break to force the page-break to move up in the document. Other methods such as modifying the spacing of the lines of text, the size of the font, the spacing between paragraphs, etc. can also be used to force the page-break to a new location. Forcing and maintaining page-breaks at specific locations using these techniques can be time consuming, especially for large documents. Therefore there is a need for an improved method for forcing page-breaks to specific locations within a document.

"MICROSOFT WORD" and "MICROSOFT EXCEL" address this particular need by supporting two types of page-breaks. The first type consists of page-breaks that are automatically inserted, by the document processing program, at page boundaries. These are referred to as automatic page-breaks. As information is entered into or deleted from a document, the document processing program automatically identifies page boundaries and places automatic page-breaks accordingly. The second type consists of page-breaks that a user can enter at any location within the document. These are referred to as manual page-breaks. The manual page-breaks are static within an electronic document. Thus, as information is entered into a document or deleted from a document, the manual page-breaks are not adjusted. For example, consider a manual page-break that is located after the last line of page one and before the first line of page two. If all of the lines on page one are deleted without removing the manual page-break, the manual page-breaking will remain before the first line of page two and page one will be blank.

The use of automatic and manual page-breaks greatly enhances the usefulness of document processing programs; however, current techniques lack efficiency and simplicity. For instance, in order to change the position of a manual page-break, the user typically conducts the following actions:

(1) select a manual page-break by using a mouse or similar means;

(2) delete the manual page-break by entering the appropriate user commands;

(3) allow the document to repaginate automatically or force a repagination by entering the appropriate user commands;

(4) move a pointer to a location to place a new manual page-break; and then (5) enter a manual page-break by entering the appropriate user commands.

Thus, although providing a manual page-break feature allows a user to force page-breaks to occur at specific locations, there is also a need for a simple and efficient method of manipulating the position of manual page-breaks within an electronic document.

When entering a manual page-break into an electronic document the user must perform steps (3)–(5) of the above listed steps. For large documents, this process can be burdensome. However, because typical document processing programs place automatic page-breaks within a document, it is desirable to have the capability to convert an automatic page-break into a manual page-break and then move the manual page-break to a new location. Therefore, there is a need for a simple and efficient method of converting an automatic page-break into a manual page-break and then moving the manual page-break to a new location.

When users create a hard-copy of an electronic document, they may desire a certain section of data to appear on a single page (i.e., a formatted table, a paragraph, a bulletized list, etc.). The user can force this to occur by entering a manual page-break before and after this section of data. However, if the section of data is too large to fit on one page, a document processing program will usually insert an automatic page-break between the two manual page-breaks. In order to allow more flexibility in formatting the layout of hard-copies of an electronic document, some document processing programs provide a scaling factor. The scaling factor, represents a percentage to either reduce or increase the size of the printed information. Thus, if a user desires to print two pages of information onto a single page, the user can select a reducing scaling factor of 50%. This will reduce the size of the information printed or displayed so that more information can fit on a page.

Defining a scaling factor for a document typically requires a user to select a series of pull-down menu items or enter appropriate user commands followed by a new scaling factor. A problem associated with using scaling factors is that it is not always easy to identify what scaling factor is required to obtain a desired result. The user generally must engage in a trial and error process in order to identify the proper scaling factor. Thus, when using a scaling factor, a user typically conducts the following actions:

(1) select an estimated scaling factor, (2) perform the steps necessary to enter the scaling factor into the program, (3) examine the repaginated document to determine if the scaling factor is too large (typically an automatic page-break will appear between the manual page-breaks) or too small (the page contains too much empty space). This process can be quite cumbersome and may require the user to change reiteratively the scaling factors of several pages.

For large documents, performing these steps may be a tedious task. Therefore, there is a need for a method to automatically scale a selected range of data to fit onto a single page.

Providing the ability to move page-breaks within a document amplifies the problems associated with identifying a scaling factor. For instance, if a page is located between two manual page-breaks, and the manual page-breaks are moved relative to each other, then a new scaling factor must be determined. Thus, there is a need for a method to automatically determine the scaling factor for a page located between two manual page-breaks when one of the page-breaks are moved to a new location.

When a scaling factor has been modified for one page of a document, the remainder of the document should also be adjusted by the same scaling factor in order to provide a uniform appearance. In providing this uniform appearance, the smallest scaling factor selected for any particular section of the document should be applied to the entire document. Therefore, there is a need to automatically scale pages of a document as page-breaks are repositioned, select the smallest scaling factor appearing in the document, and repaginate the remainder of the document in accordance with the selected scaling factor.

Thus, there are several problems associated with utilizing page-breaks within an electronic document. Current techniques for providing page-breaks within an electronic document require too much user interaction and are too complicated. Therefore, there is a need for an improved system or method to solve these problems.

SUMMARY OF THE INVENTION

The present invention satisfies the above-described needs by providing a system and a method for manipulating page-breaks in an electronic document. This is accomplished by providing two processes: (1) a User Interface Process and (2) a System Process. The User Interface Process provides a graphical user interface allowing a user to select a page-break in an electronic document and then identify a new location for the page-break. The System Process performs the steps of moving the selected page-break to the new location and adjusting the remainder of the document to accommodate the page-break at the new location.

One aspect of the present invention is to provide a method for manipulating the position of vertical and horizontal page-breaks within an electronic document which is being displayed on the display device of a computer system. The computer system includes an input device which is used to interact with a graphical user interface. The input device allows a user to move a display-element to various locations within the displayed electronic document or to send a signal to the computer system to invoke certain actions.

In response to actuating the input device, the display-element may be positioned over a page-break in the electronic document. While the display-element is positioned over a page-break, the input device can be used to send a first signal to select the page-break. When the page-break is selected, a phantom page-break is displayed over the selected page-break, and a drag mode is activated. In response to actuating the input device while the drag mode is active, the phantom page-break can be moved to a new location in the electronic document. At this point, using the input device to send a second signal results in deactivating the drag mode, moving the selected page-break to the new location, and removing the phantom page-break. Thus, it can be appreciated that the present invention provides a simple and efficient method of positioning a page-break within an electronic document.

Another aspect of the present invention is the ability to convert an automatic page-break into a manual page-break in conjunction with moving the page-break. This is advantageous because it simplifies the process of entering and positioning manual page-breaks by eliminating the steps required for inserting a manual page-break. Thus, it can also be appreciated that the present invention provides a simple and efficient method of converting an automatic page-break into a manual page-break in conjunction with moving the automatic page-break to a new location.

Another aspect of the present invention is to automatically maintain and update a scaling factor for each page of the electronic document. The scaling factor identifies an amount to scale the contents of the page in order for the contents to fit within a set of predefined dimensions. When a selected page-break is moved to a new location, new scaling factors for the page immediately before the page-break and the page immediately after the page-break are determined. Prior to determining the new scaling factors, two conditions are examined.

First, if the selected page-break is vertically oriented and an adjacent page-break to the immediate left of the selected page-break is an automatic type page-break, the adjacent page-break is converted into a manual type page-break. Second, if the selected page-break is horizontally oriented and an adjacent page-break immediately above the selected page-break is an automatic type page-break, the adjacent page-break is converted into a manual type page-break. Then, a new scaling factor is determined for the pages bordering the selected page-break if the bordering pages are bounded by manual type page-breaks of the same orientation as the selected page-break. Thus, it can be appreciated that the present invention provides a method to automatically scale a selected range of data (i.e., a the data between two page-breaks) to fit onto a single page. It can be further appreciated that the present invention provides a method to automatically determine the scaling factor for a page located between two manual page-breaks when one of the page-breaks are moved to a new location.

After moving a page-break to a new location, the present invention provides a method to determine a minimum scaling factor for the document and then repaginates the document in accordance with the minimum scaling factor. Thus it can be appreciated that the present invention provides a method to automatically scale pages of a document as page-breaks are repositioned, select the smallest scaling factor appearing in the document, and repaginate the remainder of the document in accordance with the selected scaling factor.

These and other aspects, features, and advantages of the present invention will be more clearly understood and appreciated from a review of the following detailed description of the present invention and possible embodiments thereof, and by reference to the appended drawings and claims.

DETAILED DESCRIPTION

The present invention is directed toward a system and a method for manipulating page-breaks in an electronic document. In one embodiment, the invention is incorporated into the "MICROSOFT EXCEL 97" product, a spreadsheet application program published by Microsoft Corporation of Redmond, Wash. Briefly described, the exemplary embodiment allows a user to easily select a page-break in an electronic document and move the page-break to a new location. In response to moving a page-break, the exemplary embodiment will automatically adjust the scaling factor for the pages affected by moving the page-break, determine the minimum scaling factor for the document, and repaginate the document accordingly.

Operating Environment

Although an exemplary embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the PU via a communications network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein. The specialized apparatus could consist of dedicated computer systems in a specific network architecture with hard-wired logic or programs stored in nonvolatile memory, such as read only memory, magnetic storage devices, or optical storage devices.

Figure 1:
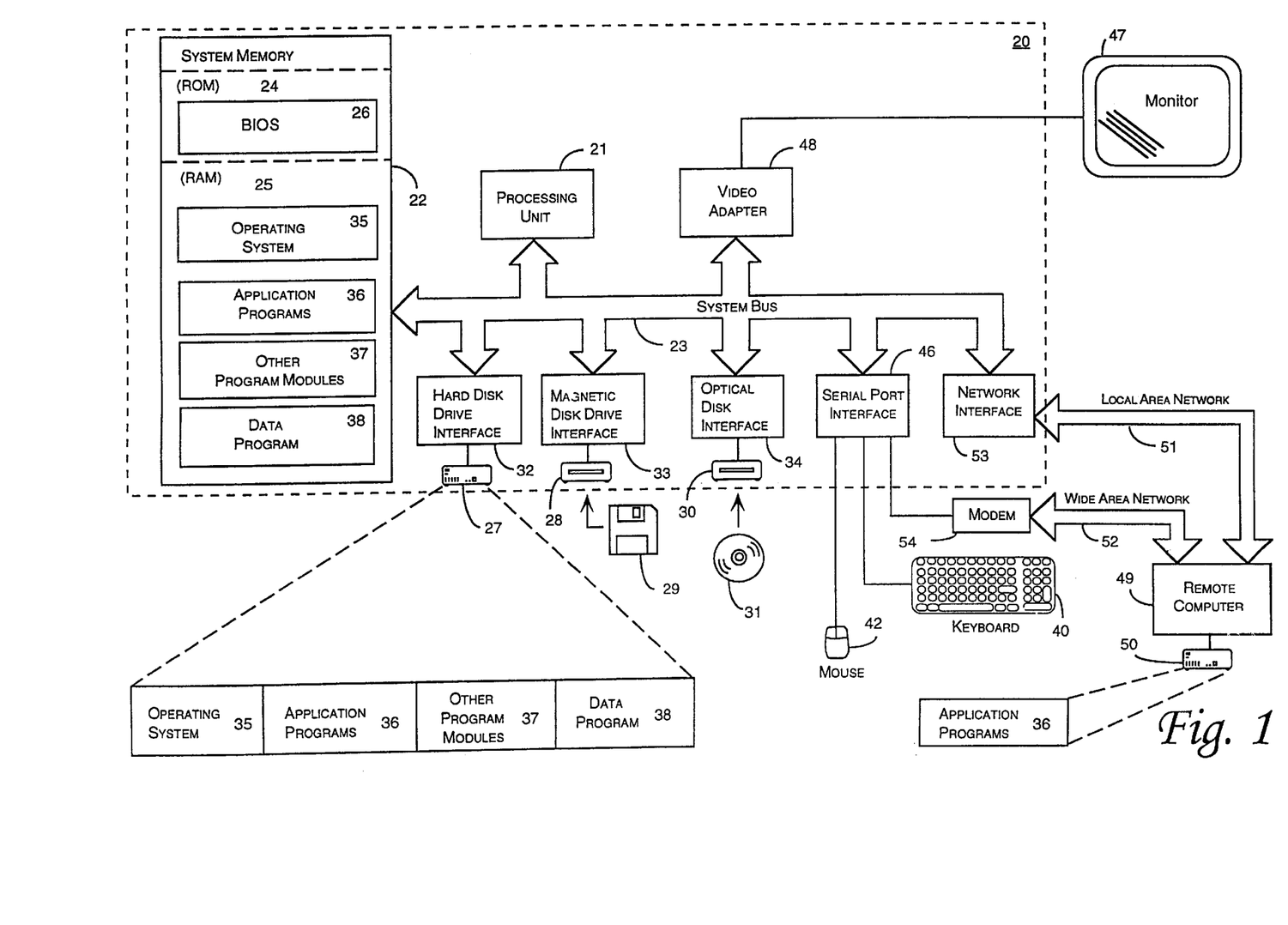
FIG. 1 is a block diagram of a conventional personal computer suitable for supporting the operation of an exemplary embodiment of the present invention.

Referring now to the drawings, in which like numerals represent like elements throughout the several figures, aspects of the present invention and an exemplary operating environment will be described. FIG. 1 in conjunction with the following discussion is intended to provide a brief, general description of a suitable computing environment in which the invention may be implemented. While the invention will be described in the general context of one or more program modules running in cooperation with an operating system on a personal computer, those skilled in the art will recognize that the invention also may be implemented in other contexts. Generally, program modules include routines, sub-routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28 for the purpose of reading from or writing to a removable disk 29, and an optical disk drive 30 for the purpose of reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, track ball, light pen, game pad, scanner, camera, or the like. These and other input devices are often connected to the processing unit 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation of an Exemplary Embodiment

An exemplary embodiment allows a user to view an electronic document on a display device of a computer. The electronic document consists of information separated by vertically and/or horizontally oriented page-breaks. An exemplary embodiment can be described as consisting of two processes. The first process involves accepting the input of commands for selecting and moving a page-break within an electronic document. This is referred to as the User Interface Process. The second process is performed in response to moving a page-break to a new location. This process involves identifying new scaling factors for the pages bordering the moved page-break and repaginating the document in accordance with these new scaling factors. This process is referred to as the System Process.

User Interface Process

The User Interface Process involves receiving commands for selecting one of the vertically or horizontally oriented page-breaks displayed in the electronic document, and dragging the selected page-break to a new location. These commands include a positioning command which identifies the movement of a pointing device such as a mouse, and a signaling command which signifies the pressing of a key such as a mouse button. Minimally, the User Interface Process requires a means for selecting a particular page-break, activating a drag mode, and dragging the page-break to a new location.

Figure 2A:
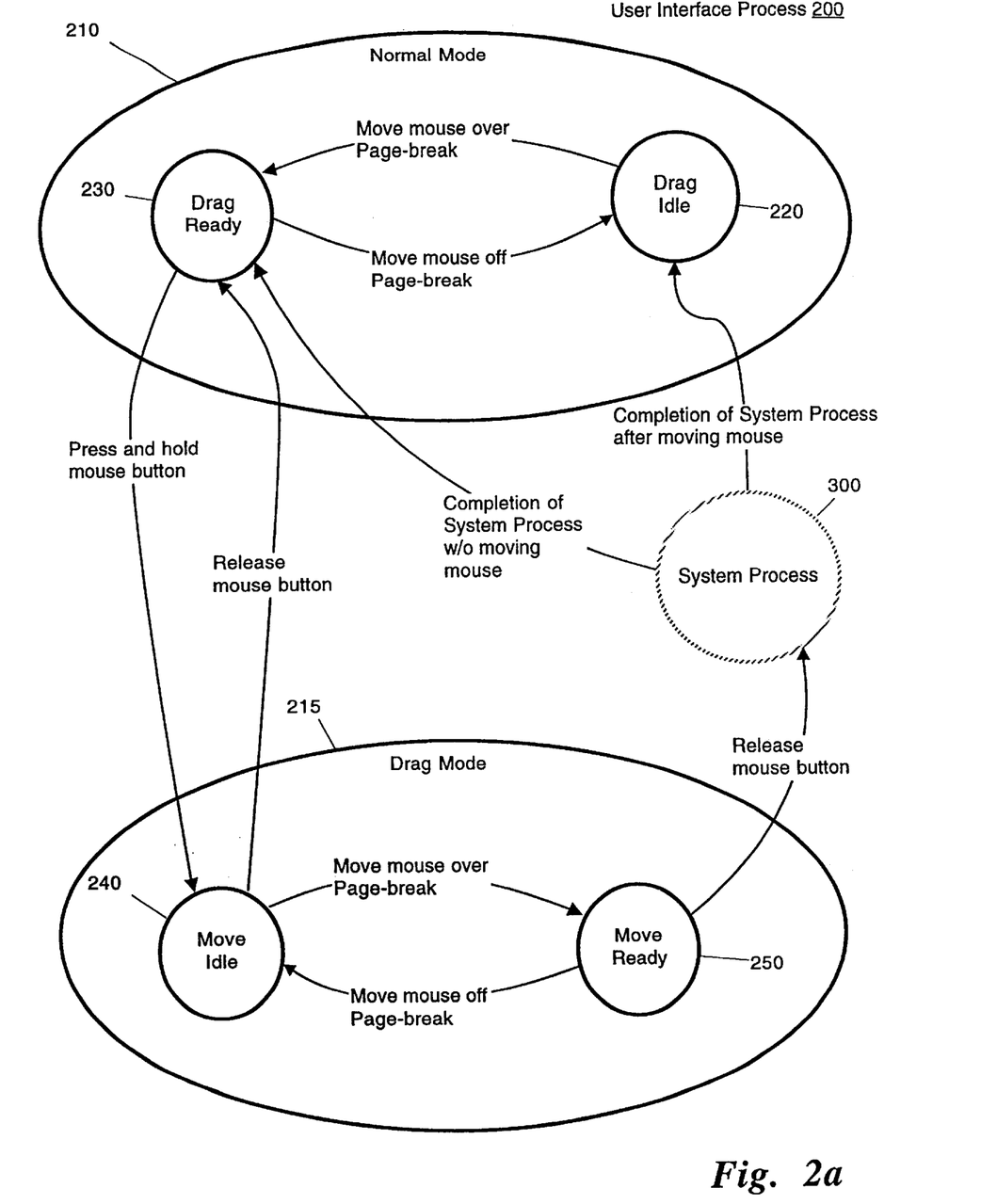
FIG. 2a is a general state diagram illustrating User Interface Process of an exemplary embodiment.
Figure 2B:
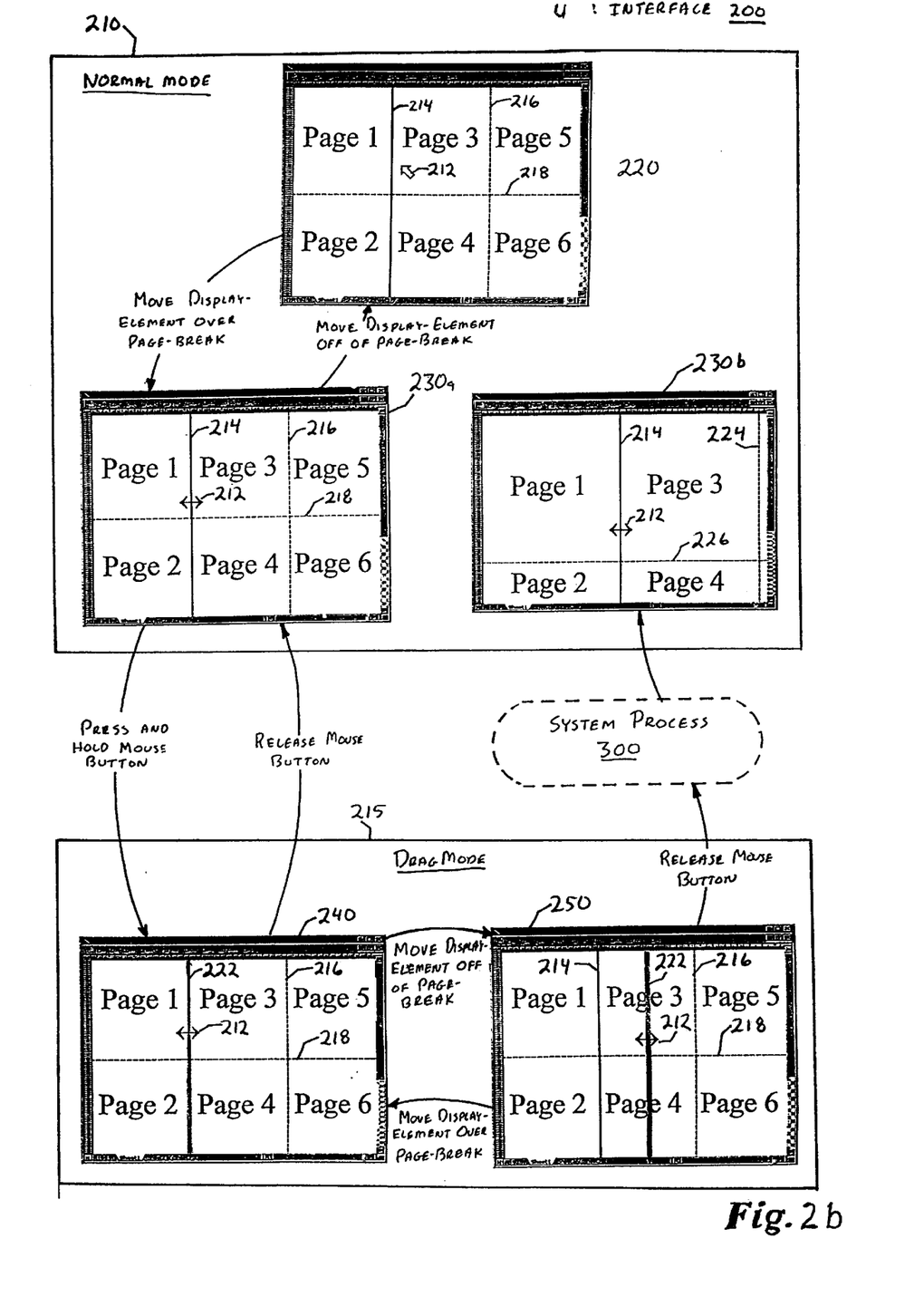
FIG. 2b is a state diagram illustrating the operation of the User Interface Process of an exemplary embodiment for a specific example.

The User Interface Process can be described as a state machine. In general, a state machine illustrates the operation of a process by identifying discrete states in which the process can exist, and identifying events or circumstances which result in a transition to a different state. FIG. 2a is a general state diagram illustrating the User Interface Process 200 of an exemplary embodiment. FIG. 2b is a state diagram illustrating the operation of the User Interface Process 200 of an exemplary embodiment for a specific example.

Referring to both FIGS. 2a and 2b, two user modes are illustrated, Normal Mode 210 and Drag Mode 215. The Normal Mode 210 consists two mutually exclusive states. The active state is a function of the location of a display-element. In FIG. 2a the two Normal Mode 210 states include: Drag Idle 220 and Drag Ready 230. In FIG. 2b, the Drag Ready state is broken into two states 230a and 230b. Drag Idle 220 is the active state when a display-element is not positioned over a page-break. Drag Ready 230, becomes the active state when a display-element is positioned over a page-break. A mode change from Normal Mode 210 to Drag Mode 215 can only occur when Drag Ready 230 is the active state. The mode change from Normal Mode 210 to Drag Mode 215 occurs as the result of selecting a page-break that is under the display-element and the resulting state is the Move Idle 240 state.

Drag Mode 215 consists of two mutually exclusive states. Similar to the Normal Mode 210, the active Drag Mode 215 state is a function of the location of a display-element. The two Drag Mode 215 states include: Move Idle 240 and Move Ready 250. Move Idle 240 becomes the active state when a display-element is positioned over a selected page-break. Move Ready 250, becomes the active state when a display-element is positioned at a location other than over the selected page-break.

FIGS. 2a–b also illustrate the relationship of the System Process 300 and the User Interface Process 200.

Each of the states in FIG. 2a are illustrated in FIG. 2b as display diagrams of a typical worksheet created by using the "MICROSOFT EXCEL" program. A worksheet consists of a grid of cells arranged in a series of intersecting rows and columns. The display scaling of the worksheets in FIG. 2b has been reduced in order to allow multiple pages to be displayed simultaneously. In each of these display diagrams, the location of a manual page-break is illustrated by a solid line and the location of an automatic page-break is illustrated by a dashed line.

In response to actuating a positioning means of an input device, (i.e., moving a mouse) in Normal Mode 200, an exemplary embodiment moves a display-element 212 across the display screen. If the display-element 212 is positioned over a page-break of the electronic document, then a transition to the Drag Ready state 230a occurs. Moving the display-element 212 off of a page-break results in a transition back to the Drag Idle state 220. The display diagram for the Drag Idle state 220 contains a manual vertically oriented page-break 214 located between Pages 1 and 3 and Pages 2 and 4; an automatic vertically oriented page-break 216 Pages 3 and 5 and Pages 4 and 6; and an automatic horizontally oriented page-break 218 located between Pages 1 and 2, Pages 3 and 4, and Pages 5 and 6. The display-element 212 in the Drag Idle state 220 display diagram is located within the boundaries of Page 3.

In the display diagram for the Drag Ready state 230a, the transition to the Drag Ready state 230a occurs when the display-element 212 is positioned over the manual vertically oriented page-break 214. The transition to the Drag Ready state 230a may be indicated by changing the shape of the display-element 212 as illustrated in FIG. 2b.

A mode change from Normal Mode 210 to Drag Mode 215 occurs as the result actuating a signal generating means of an input device (i.e., pressing and holding a mouse button) while the Drag Ready state 230a is active. In the Drag Ready state 230a display diagram, the display-element is positioned over a page-break 214 when the mouse button is pressed. The page-break 214 under the display-element at the time the mouse button is pressed is referred to as the selected page-break 214.

When entering the Drag Mode 215, the Move Idle state 240 is initially active and a phantom page-break 222 is displayed over the selected page-break 214. The phantom page-break 222 appears in the Drag Mode 215 display diagram as a thick, solid gray line. In the Drag Mode 215, the user can move the phantom page-break 222 across the screen by operating the mouse. When the phantom page-break 222 is moved off of the selected page-break 214, a transition to the Move Ready state 250 occurs. In the Move Ready state 250, the phantom page-break 222 identifies a new location for moving the selected page-break 214. Moving the phantom page-break 222 over the selected page-break 214 will cause a transition back to the Move Idle state 240.

Releasing the mouse button in the Drag Mode 215 will result in changing back to the Normal Mode 210. Upon exiting the Drag Mode 215, the phantom page-break 222 is removed from the display. If the Move Idle state 240 is active when the mouse button is released, the Drag Ready state 230a will be re-entered. If the Move Ready state 250 is active when the mouse button is released, the mode change to Normal Mode 210 will occur after the completion of System Process 300.

System Process

Figure 3:
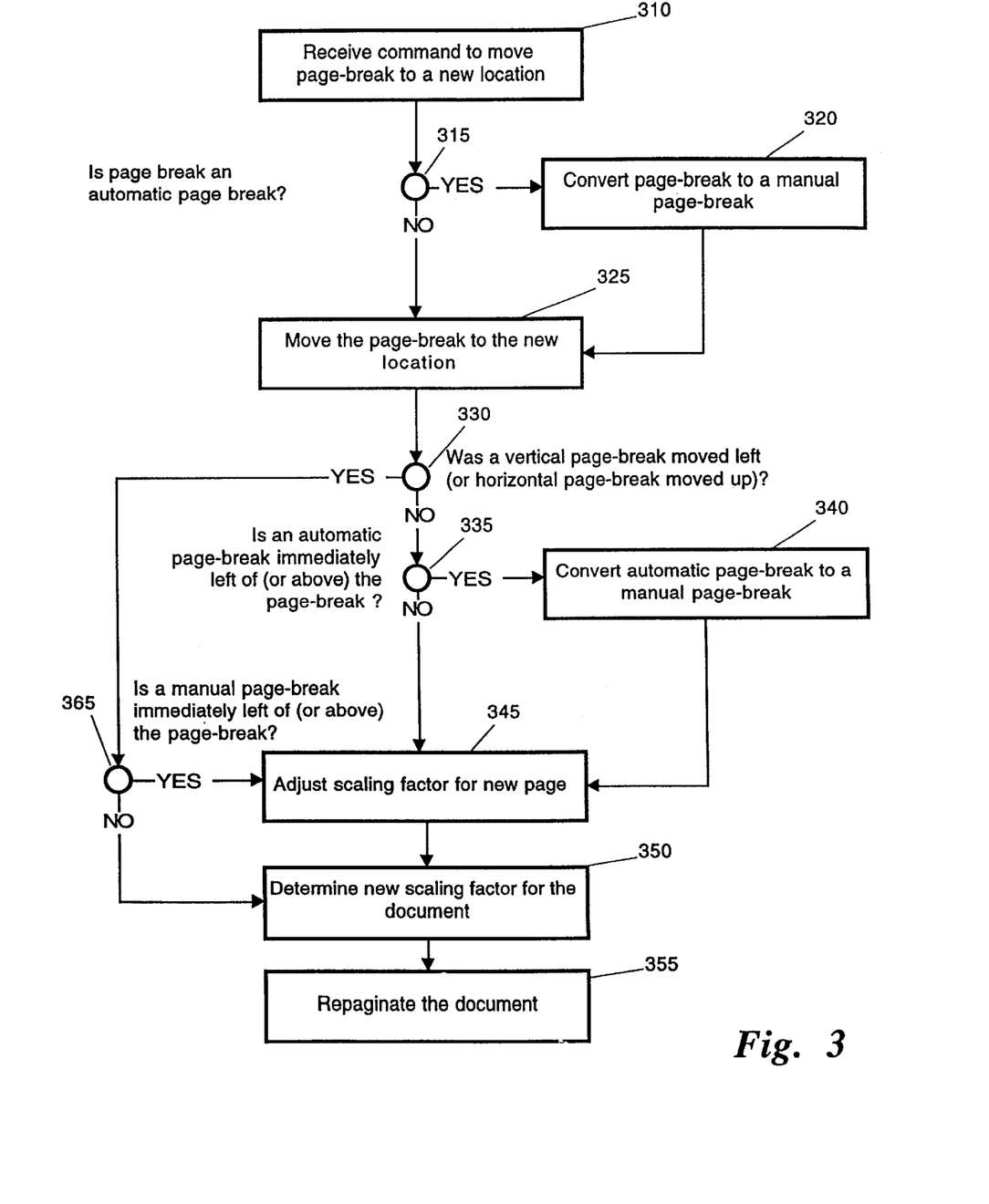
FIG. 3 is a flow diagram illustrating the System Process of an exemplary embodiment.

System Process 300 is invoked in response to releasing the mouse button in when the Move Ready state 250 of the Drag Mode 215 is active. In System Process 300, the selected page-break 214 is moved to the location identified by the phantom page-break 222 and the phantom page-break is removed from the display.

FIG. 3 is a flow diagram illustrating the steps performed by the system process of an exemplary embodiment. The system process begins at step 310 with the reception of a command to move a selected page-break from an initial location to a new location. Processing then continues at point 315 where the type of the selected page-break is examined. If it is determined at point 315, that the selected page-break is an automatic page-break type, then processing continues at step 320. At step 320, the automatic page-break is converted into a manual page-break and then processing continues at step 325. If at point 315, the selected page-break is not an automatic page-break, then processing continues at step 325.

At step 325, the selected page-break is moved to the new location identified in the received command. This process includes moving the page-break code embedded in the electronic document, to a new location identified by the phantom page-break.

The remaining steps in the system process are concerned with performing adjustments to the document in order to accommodate the selected page-break at the new location. At point 330, the new location of the page-break is examined in relation to the previous location. If the page-break is vertically oriented and the new location is to the right of the previous location, then processing continues at point 335. Likewise, if the page-break is horizontally oriented and the new location is located below the previous location, processing continues at point 335. Finally, if the new location is neither to the right nor below the previous location, then processing continues at point 365.

At point 335, the page-break immediately to the left of the vertically oriented page-break or immediately above the horizontally oriented page-break is examined. If the examined page-break is an automatic type page-break, then processing continues at step 340. Otherwise, processing continues at step 345. At step 340, the examined page-break is converted from an automatic type page-break to a manual type page-break prior to continuing at step 345.

At point 365, if the page-break to the immediate left or immediately above the moved page-break is a manual page-break, then scaling of the new page is necessary and processing continues at step 345. Otherwise processing continues at step 350.

At step 345, the scaling factor for the pages adjoining the moved page-break are automatically adjusted. An exemplary embodiment maintains a scaling factor for each page in the document. As previously described, the scaling factor identifies an amount to reduce or increase the size of the information contained on the page. In one embodiment, the scaling factor is expressed as a percentage of the 1:1 scale or ratio. Additionally, an exemplary embodiment may maintain an overall scaling factor for the document. The use of an overall scaling factor allows uniformity within the document. In an exemplary embodiment, the overall scaling factor is set to the smallest scaling factor maintained for each page of the document. This results in forcing the page with the most information to be printed or displayed at a scale which allows all of the information to appear on a single page. Furthermore, the information contained in the rest of the document is forced to be printed or displayed at the same scale.

The adjustments performed to the scaling factors at step 345 depend on the new location of the moved page-break relative to the previous location. If the moved page-break is vertically oriented, then the pages to the immediate left and right of the moved page-break are adjusted. The page to the immediate left is adjusted by identifying a new scaling factor. The page to the immediate right is adjusted by entering automatic page-breaks if required If the moved page-break is horizontally oriented, then the pages immediately above and below the moved page-break are adjusted. Each of the possible adjustment scenarios are described below. After adjusting the scaling factor for the adjoining pages, processing continues at step 350.

The first adjustment scenario occurs when the moved page-break is vertically oriented and the new location is to the left of the previous location. In this scenario, the amount of information between the moved page-break and the manual page-break or margin to the immediate left of the moved page-break decreases. Therefore, the scaling factor for this information may be increased to allow the reduced amount of information to fill up the page. In contrast, the amount of information between the moved page-break and the manual page-break or margin to the immediate right of the moved page-break increases. Therefore, the scaling factor for this page may be decreased in order to fit the additional information onto the page or automatic page-breaks may be inserted. If a page is bordered by an automatic page-break on either side, then the scaling factor for the page is not changed.

The second adjustment scenario occurs when the moved page-break is vertically oriented and the new location is to the right of the previous location. In this scenario, the amount of information between the moved page-break and the page-break or margin to the immediate left of the moved page-break increases. Therefore, the scaling factor for this information must be decreased in order to fit the additional information onto the page. In contrast, the amount of information between the moved page-break and the page-break or margin to the immediate right of the moved page-break decreases. Therefore, the scaling factor for this page may be increased in order to allow the reduced amount of information to fill up the page. However, if the page-break to the immediate right is an automatic page-break, the scaling factor for this page is not changed.

The third adjustment scenario occurs when the moved page-break is horizontally oriented and the new location is above the previous location. In this scenario, the amount of information between the moved page-break and the page-break or margin immediately above the moved page-break decreases. Therefore, the scaling factor for this information may be increased to allow the reduced amount of information to fill up the page. In contrast, the amount of information between the moved page-break and the page-break or margin immediately below the moved page-break increases. Therefore, the scaling factor for this page may be decreased in order to fit the additional information onto the page or automatic page-breaks may be inserted.

The fourth adjustment scenario occurs when the moved page-break is horizontally oriented and the new location is below the previous location. In this scenario, the amount of information between the moved page-break and the page-break or margin immediately above the moved page-break increases. Therefore, the scaling factor for this information must be decreased in order to fit the additional information onto the page. In contrast, the amount of information between the moved page-break and the page-break or margin to immediately below the moved page-break decreases. Therefore, the scaling factor for this page may be increased in order to allow the reduced amount of information to fill up the page. However, if the page-break immediately below is an automatic page-break, the scaling factor for this page is not changed.

At step 350, the new overall scaling factor for the document is determined. This step can be accomplished in a variety of other methods. In an exemplary embodiment, an overall scaling factor variable is maintained. The overall scaling factor identifies the smallest scaling factor within the document. After the completion of step 345, if the value of the scaling factor for one of the adjusted pages is smaller than the value of the overall scaling factor, then the overall scaling factor is set to this new value. If the previous scaling factor for one of the adjusted pages was equal to the overall scaling factor and the scaling factor for that page is increased, then the scaling factor must be re-calculated for all of the pages in the document and a new overall scaling factor will be set to the smallest of these. Otherwise, the overall scaling factor remains the same.

After identifying a new overall scaling factor, processing continues at step 355 where the document is repaginated in accordance with the new overall scaling factor. The repagination of the document can be performed in a variety of ways and those skilled in the art will be familiar with the various repagination algorithms. In general, the repagination process of an exemplary embodiment has the overall effect of maintaining the manual page-breaks at their current location, removing all automatic page-breaks, and then inserting new automatic page-breaks in accordance with the new overall scaling factor.

After repaginating the document, the system process is concluded and the user interface process returns to the Normal Mode 210 in either the Drag Idle state 220 or the Drag Ready state 230*b*.

Returning to FIGS. 2*a*–*b,* the results of the System Process 300 in response to releasing the mouse button in Move Ready state 250 are illustrated. In the display diagram for the Drag Ready state 250, the phantom page-break 222 has been positioned in the middle to Page 3 and Page 4. Upon releasing the mouse button, the System Process is invoked. At the completion of the system process, the Drag Ready state 230*b* of the Normal Mode 210 is entered. In the display diagram for Drag Ready state 230*b,* the selected page-break 214 is moved to the location occupied by the phantom page-break 222 and the phantom page-break is removed. Because the new location of the page-break is to the right of the previous location and the moved page-break 214 is a vertical page-break, the second adjustment scenario applies.

Applying the second adjustment scenario rules, the scaling factor for Page 1 must be decreased due to the increase in the amount of information included in Page 1. Further, although the information in Page 2 decreased, the presence of automatic page-break on the right-hand border of Page 3 eliminates the need to determine a new scaling factor for Page 3. Examining the display diagram for Drag Ready state 230*b,* it is observed that the overall scaling factor for the document has been modified by moving manual page-break 212 to the right. This is evidenced by the repositioning of the automatic page-breaks in accordance with the new overall scaling factor. Thus, automatic page-breaks 216 and 218 have been removed and new automatic page-breaks 224 and 226 have been entered. The locations of automatic page-break 224 and 226 indicate that the information included on a single page has been increased commensurate with the reduced overall scaling factor.

From the foregoing description, it will be appreciated that the present invention provides a system and a method to manipulate page-breaks within an electronic document. Although the present invention has been described as embodied within a spreadsheet program, it will be appreciated that the present invention can be utilized in any type of application performing document processing. This includes project planners, scheduling programs, word processors, drawing programs, and the like. Indeed, the present invention is not limited to any particular application.

The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

We claim:

1. A method for manipulating a page-break within an electronic document having multiple pages, wherein the page-break can be one of a plurality of types including a manual type page-break and an automatic type page-break, the method comprising:

receiving a selection of the page-break at an initial location from a person editing the electronic document;

receiving a selection of a new location from the person;

moving the page-break from the initial location to the new location without cutting and pasting by the person; and repaginating the electronic document to accommodate the page-break at the new location; and converting the page-break to a manual type page-break if the page-break is an automatic type page-break.

2. A method of manipulating a page-break within an electronic document having multiple pages, wherein each page of the electronic document has a scaling factor, the scaling factor identifying an amount to scale the contents of the page in order for the contents of the page to fit within a set of predefined dimensions, the method comprising:

receiving a selection of the page-break at an initial location from a person editing the electronic document;

receiving a selection of a new location from the person;

moving the page-break from the initial location to the new location without cutting and pasting by the person, wherein moving the page-break from the initial location to the new location comprises:

if the selected page-break is vertically oriented, the new location is to the right of the initial location, and a first adjacent page-break to the immediate left of the selected page-break is an automatic type page-break, converting the first adjacent page-break to a manual type page-break; and adjusting the scaling factor for the page to the left of the selected page-break;

if the selected page-break is horizontally oriented, the new location is below the initial location, and a second adjacent page-break immediately above the selected page-break is an automatic type page-break; converting the second adjacent page-break to a manual type page-break; adjusting the scaling factor for the page above the selected page-break; and determining the minimum scaling factor for the electronic document; and repaginating the electronic document to accommodate the page-break at the new location.

3. The method of claim 2, wherein repaginating the electronic document comprises:

removing all automatic type page-breaks from the electronic document; and without modifying the location of any manual page-breaks, inserting automatic page-breaks in accordance with the minimum scaling factor for the electronic document ensuring that the contents of each page will fit within the set of predefined dimensions.

4. A method for manipulating a delimiter within an electronic document having multiple pages, the delimiter marking an end of useable text space on a first page and a beginning of useable text space on a next page, the method comprising:

receiving a first command to select the delimiter to be moved from an initial location to a new location;

in response to receiving the first command, displaying a phantom delimiter positioned over the selected delimiter, and activating a drag mode;

receiving a second command to drag the selected delimiter to the new location;

in response to receiving the second command, moving the phantom delimiter to the new location;

receiving a third command to deselect the delimiter at the new location;

in response to receiving the third command, deactivating the drag mode, automatically moving the delimiter to the new location, and removing the phantom delimiter; and repaginating the electronic document to accommodate the selected delimiter at the new location.

5. The method of claim 4 wherein the delimiter is a page-break.

6. The method of claim 4 wherein the delimiter is a margin.

* * * * *